United States Patent [19]

Miraldi

[11] 3,825,758

[45] July 23, 1974

[54] SCINTILLATION CRYSTAL

[76] Inventor: Floro D. Miraldi, 2660 Edgehill Rd., Cleveland Heights, Ohio 44106

[22] Filed: Apr. 9, 1973

[21] Appl. No.: 349,022

Related U.S. Application Data

[63] Continuation of Ser. No. 179,749, Sept. 13, 1971, abandoned.

[52] U.S. Cl. ............................... 250/366, 250/367
[51] Int. Cl. ............................................ G01t 1/20
[58] Field of Search .......................... 250/366, 367

[56] References Cited
UNITED STATES PATENTS 3,088,030   4/1963   Rickard ............................. 250/366
3,169,187   2/1965   Stone et al. ........................ 250/370
3,539,806   11/1970  Humphrey ..................... 250/367 X Primary Examiner—Archie R. Borchelt
Attorney, Agent, or Firm—Fay & Sharpe; David B. Deioma

[57] ABSTRACT

A plurality of elongated scintillation crystals combined in a unit. The scintillation crystals may be either parallel bars or concentric tubular members. In either event separators such as aluminum foil may be used to prohibit signals from crossing between scintillation crystals. Magnesium oxide holds the individual scintillation crystals together as a unit and acts as a highly reflective material to enhance the transmission of the signals.

4 Claims, 7 Drawing Figures

INVENTOR.
FLORO D. MIRALDI
BY
Fay, Sharpe & Mulholland
ATTORNEYS

INVENTOR.
FLORO D. MIRALDI
BY
Fay, Sharpe & Mulholland
ATTORNEYS

SCINTILLATION CRYSTAL

This is a continuation of application Ser. No. 179,749, filed Sept. 13, 1971, and now abandoned.

BACKGROUND OF THE INVENTION

This invention is designed to be used in the type of device described in application Ser. No. 48,166. The general concept of the use of a moving bar of scintillation crystals for a fast scanning system was proposed by David and Martone, J. Nuclear Med. 7:114-124, February, 1966. In their system, a rod of phosphor was moved linearly in one direction across the region to be scanned. A two dimensional map of the radioactive distribution of the scanned body was obtained by noting the bar position and simultaneously determining the position of a scintillation along the bar. Although the bar position could be accurately ascertained, the scintillation position along the bar was very uncertain. The system, therefore, yielded poor resolution.

The poor resolution along the bar was due to two main factors: (1) the crystal design used did not yield good resolution, and (2) the electronics did not adequately discriminate between the electrical impulses in the desired range. The above-noted application considers the latter point and deals with it at some length. This invention pertains to the crystal design.

In the past it has always been difficult to determine with great accuracy the position of a scintillation in a scintillation crystal in the form of a bar. This invention generally relates to the determination of the position of a scintillation in a bar scintillation crystal by observing the amplitude of the light pulses exiting from the ends of the bar. If $A(x)$ represents the spectral distribution from a scintillation occurring at position $x$ measured from one end of the bar, the functional dependence has been empirically shown to be $A(x) = A(o)e - \alpha x$ where $\alpha$ is a function of several crystal parameters and $A(o)$ is a constant when $x = o$. In order to discriminate between two scintillations a distance $\Delta x$ apart, the change in $[A(x + \Delta x) - A(x)]$ must be significant with regard to the electronic capability. This can be shown mathematically as follows:

$$A(x) = A(o)e - \alpha x$$
$$A(x + \Delta x) = A(o)e - \alpha (x + \Delta x)$$
$$= A(o)e - \alpha x - \alpha \Delta x$$
$$= [A(o)e - \alpha x]e - \alpha \Delta x$$

Then $$A(x + \Delta x) - A(x) = (A(o)e - \alpha x)ex - \alpha \Delta x - A(o)e - \alpha x$$
$$= A(o)e - \alpha x [e - \alpha \Delta x - 1]$$

Therefore a change of $[A(x + \Delta x) - A(x)]$ is proportional to $$[e - \alpha \Delta x - 1]$$

For a fixed capability of electronics, the value $x$ becomes smaller the larger the $\alpha$. The value of $\alpha$ can be varied by adjusting the reflectivity of the crystal at its surface. Theoretically, $\alpha$ could vary from zero (perfect reflector) to some maximum value corresponding to a perfect absorber at which time the attenuation would have an inverse square dependence. David and Martone chose to adjust $\alpha$ by manipulation of the surface reflectivity and thereby encountered problems.

The problems included a failure to realize that increasing the constant by altering the reflectivity causes the entire spectrum to become depressed. That is, they failed to realize that the constant $A(o)$ is depressed as reflectivity decreased. Therefore, all values of $A(x)$ are reduced and as $A(x)$ decreases, the uncertainty of the spectrum increases. If one considers only the photopeak, for example, this says that the spread in the photopeak increases and the amplitude decreases as the reflectivity decreases. Thus, the factor tending to improve spatial resolution is counteracted by another tending to destroy it.

The solution to the dilemma is to prepare the surface in a manner to yield the highest reflectivity possible. This then provides the highest $A(o)$ and, in general, the smallest uncertainty. With high reflectivity, a large value must be obtained by taking advantage of other parameters. The easiest to apply is geometry, but another is optical transmission of the crystal. All crystal designs which are described are therefore made with high surface reflectivity, but with drastic geometry alterations to yield large $\alpha$'s. In addition to the designs described below, a large number of other systems and/or variations could be suggested but success will only be obtained if high reflectivity is coupled with large $\alpha$ from geometry or transmission changes.

SUMMARY OF THE INVENTION

A scintillation crystal formed of elongated members combined in a single unit having at least one side and ends whereby radiation may be received through the side of the unit and measurements may be taken at the ends of the unit to determine the position of the scintillation in the crystal.

PREFERRED EMBODIMENT

Figure 1:
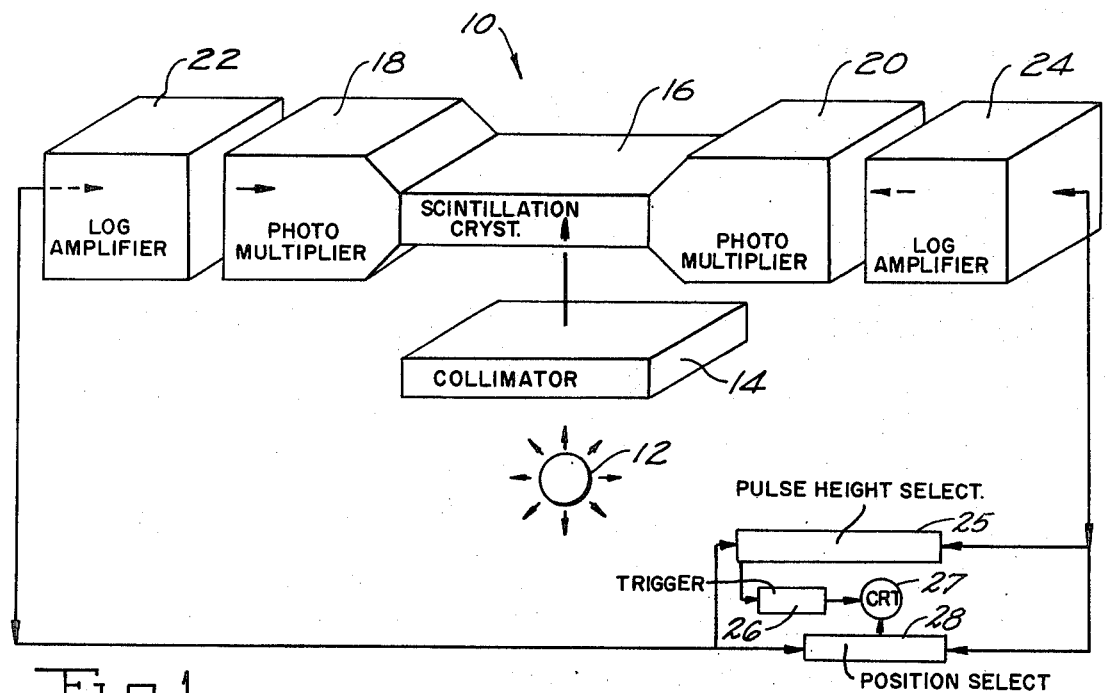
FIG. 1 is a schematic representation of the type of system in which the scintillation crystal of this invention is used.

The system 10 includes a source of gamma or other radiation 12, transmitting radiation through a collimator 14 to scintillation crystal 16. In the scintillation crystal the radiation is converted to radiation which is detected by photomultiplier tubes 18 and 20. Electrical outputs proportional to the light radiation are transmitted from the photomultiplier tubes 18 and 20 to electronic analysis.

The electronics include log amplifiers 22 and 24 respectively, which receive the electrical impulses from the photomultiplier tubes and transmit them to a pulse height selector 25. The selector 25 is used to discriminate between different pulses which then act through a trigger 26 to signal a cathode ray tube 27. A position selector 28 is also electronically connected with the log amplifiers to aid in determining the location of the scintillation within the crystal. The details of the actual system in which this scintillation crystal is used is disclosed in an earlier application, Ser. No. 48,166, the disclosure of which is hereby incorporated by reference.

In all of the embodiments radiation is received somewhere along the length of the crystal through its side. When a scintillation occurs the radiation (usually gamma) is converted to light radiation which passes longitudinally through the crystal. It has been found that the use of multiple crystals having generally uniform cross-sections and arranged in a parallel configuration brings about high accuracy in locating the actual place the scintillation took place within the crystal.

Some background is needed to fully understand the significance of this improvement. As noted in FIG. 1, the signals from the photomultiplier tubes are changed to logarithms before acted upon by pulse height selector. Previously, pulse photopeak height selection was made before conversion to logarithms. However, because of the variation of the signal at the end of the scintillation crystal with distance along the crystal was exponential and not linear it was difficult if not impossible to make an accurate pulse height selection. Converting the amplitudes to logarithms of the amplitudes and thereby obtaining a linear distribution, it became possible to sum the logarithms, obtain a constant and make an accurate pulse height selection. This relationship can be shown mathematically as:

$$1N\ A_1 = \ln A_0 - \alpha x$$
$$\ln A_2 = \ln A_0 - \alpha(L-x)$$

where $A_1$ is the amplitude of a pulse received by the first photomultiplier tube, $A_2$ is the amplitude of the pulse received by the second photomultiplier tube for a given distance $x$ for a scintillation along the scintillation crystal having a length equal to L. $A_0$ is a constant equal to the response of the photomultiplier tube when $x$ is equal to $o$. Alpha ($\alpha$) is a constant and determined by the attenuation of the crystal. Adding logarithms $A_1$ plus logarithm $A_2$ results in $$2 \ln A_0 - \alpha L$$

Since $A_0$ is a constant, alpha is a constant and L is a constant the sum of the logarithms is therefore equal to a constant. The attenuation constant is also significant in determining the position of the scintillation within the crystal. Using the same illustration above, if the logarithm $A_1$ is subtracted from logarithm $A_2$, the result is equal to $\alpha L - 2 \alpha x$. That is, the difference of the logarithms is directly proportional to the location ($x$) of any scintillation along the length of the crystal.

Figure 2:
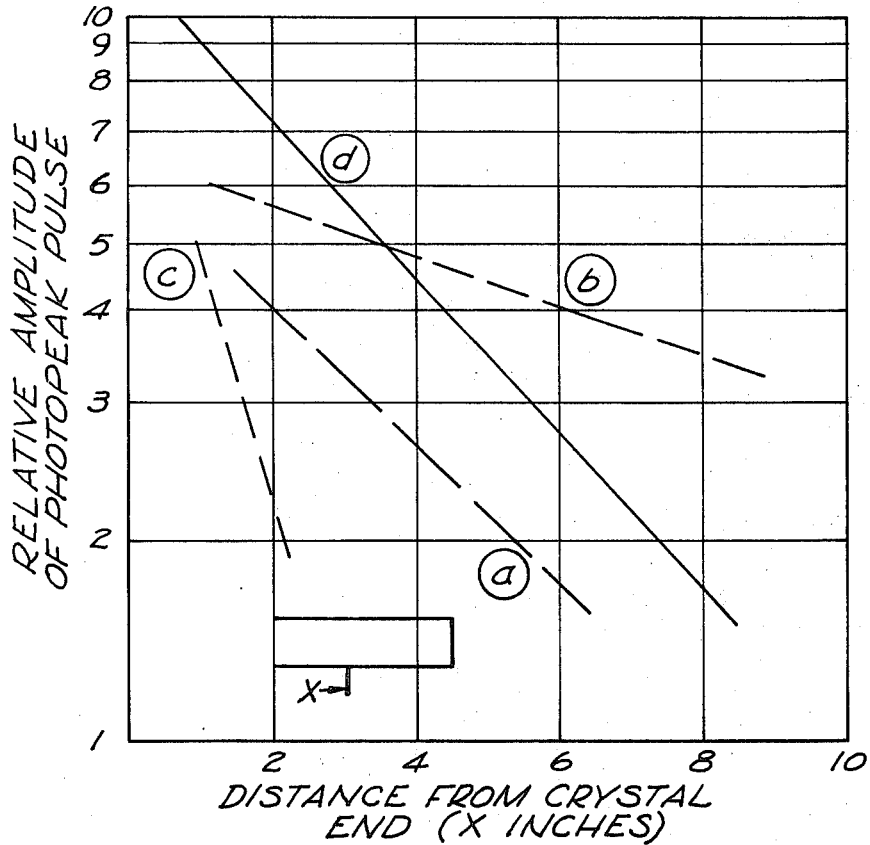
FIG. 2 is a graphical representation of the relative amplitudes of the pulses as compared to the distance between the pulse and the detection means.

The important part of this relationship has a very practical significance and is illustrated in FIG. 2. The attenuation factor $\alpha$ represents the slope of the curve. In the selection of a scintillation crystal, the attenuation factor must be adjusted to give it a slope which provides finite and easily detectible differences for different scintillation locations. Specifically, if the slope of the curve in FIG. 2 were very small, such as the dotted curve $b$, it would be nearly horizontal. Differences in length along the crystal therefore would make no significant difference in the logarithms of the amplitudes and therefore the positions of scintillation would be nearly impossible to determine. On the other hand if the slope, governed by the attenuation constant, were very large and the curves were steep the uncertainty in the amplitude of the photopeaks at lower relative amplitudes becomes so great that position is again difficult to determine. This type of curve is illustrated as a dotted curve $c$.

Previously, the shape of the scintillation crystal was chosen to give a curve such as illustrated as curve $a$. It has an acceptable slope to give realistic differences of logarithms of the amplitudes so they could be protected within an acceptable uncertainty. The problem with the type of curve $a$ is that it functions very well for the scintillations near the end of the scintillation crystal where the photomultiplier is located. However, as the distance from the ends increase, the relative amplitude of the photopeak pulse becomes so small that it is difficult to detect.

With this invention, it was found that the acceptable slope of the curve could be maintained while raising the entire curve within the bounds of the graph. That is, greater signals could be obtained from the relatively distant location of scintillations by the photomultiplier tubes without destroying the slope or shape of the curve.

Figure 3:
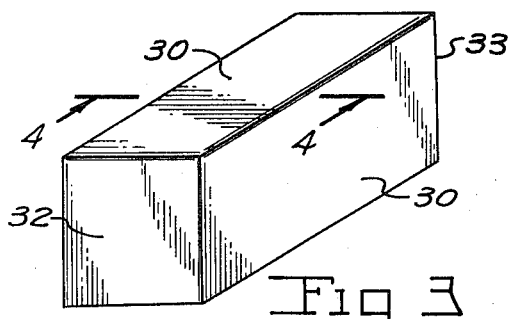
FIG. 3 is a perspective view of the crystal of this invention.

One manner in which the acceptable slope of the curve can be obtained is illustrated in FIG. 3 which is a perspective view of the outside of the scintillation crystal. The crystal is generally rectangular having sides 30 and ends 32 and 33.

Figure 4:
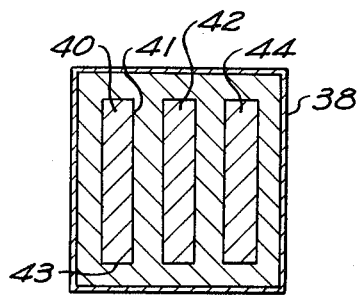
FIG. 4 is a cross-section view 4—4 of FIG. 3 and shows individual parallel crystals.

A cross-sectional view 4—4 of FIG. 3 is illustrated in FIG. 4. It shows a highly reflective coating of magnesium oxide 38 surrounding three crystals of silicon dioxide or similar scintillation material 40, 42 and 44. The individual scintillation crystals 40, 42 and 44 have a generally rectangular cross-section with one side smaller than the other. The smaller side faces the source of radiation and receives the radiation. The crystals are generally bar shaped having a uniform rectangular cross-section and a length greater than either its height or width. The height 41 and width 43 of crystal 40 is the same as the other crystals. The individual crystals are spaced from each other and from the sides of the reflector. In the embodiment of FIG. 3, there is some interaction of the scintillations among the individual crystals. This cross-talk, as it is called, is a type of interference and should be minimized. Separation of the individual crystals by magnesium oxide as shown in FIG. 3 does reduce the cross-talk.

Figure 5:
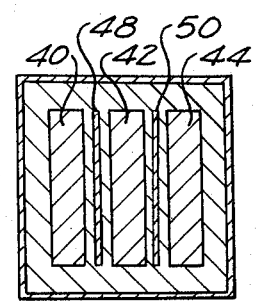
FIG. 5 is an alternate embodiment of FIG. 4 and illustrates reflective barriers between the crystals.

FIG. 5 illustrates an alternate embodiment of FIG. 4 wherein the same crystals 40 and 42 and 44 are separated by highly reflective materials 48 and 50 in order to stop any interaction of signals among the individual crystals. The material is in the form of a thin slice or foil and is equally spaced between the parallel bars. A typical reflective material is aluminum.

Figure 6:
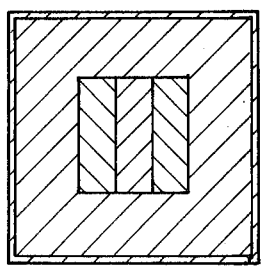
FIG. 6 is an alternate embodiment of FIG. 5 and shows the crystals in contact with one another.

FIG. 6 illustrates another alternate in which the scintillation crystals 40, 42 and 44 are adjacent to each other and surrounded by magnesium oxide 48. This specie depends upon the physical interfaces 46 and 47 to stop some of the cross-talk. In general this may be the least desirable of the species. Again, the crystals are held together as a unit within a highly reflective coating of magnesium oxide 38. An aluminum casing 49 may also be utilized to enhance the reflective qualities of the unit.

Figure 7:
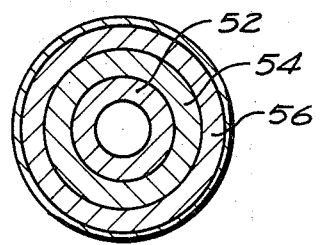
FIG. 7 illustrates a series of tubular concentric crystals.

A set of concentric tubular members as shown in FIG. 7 may also make up the scintillation crystal. In this embodiment an inner tubular member 52 has an outer diameter closely matched by the inner diameter of an outer tubular member 54. The outer member 54 is surrounded again by a highly reflective material such as magnesium oxide 56 to form the entire unit. A separator such as a metallic foil may be used to separate the concentric tubular members 54 and 56 to reduce crosstalk.

In the embodiment described herein scintillation crystals act to locate the position of the scintillations. As described in detail above the attenuation of the crystals is important in order to determine the position of the scintillations as they occur. Since the photomultiplier tubes view the scintillations from each end of the crystal it is also necessary that the ends are not blocked.

It should be understood that changes may be made in the individual shapes of the crystals and their relative positions without deviating from the thrust of this invention.

I claim:

1. A position detecting scintillation crystal unit for use in a radiation sensitive device having a source of radiation comprising:

a plurality of elongated scintillation crystals combined in a unit, each elongated scintillation crystal having a generally rectangular cross-section with one side being smaller than the other and two ends through which radiation may be transmitted, the surface of the crystal unit having a high reflectivity and the smaller side of each elongated scintillation crystal facing the source of radiation, so that radiation may be received through the smaller side of each scintillation crystal causing scintillations which result in light radiation which is attenuated as it passes through each crystal along its length and is detectable at the two ends of each crystal in order that the positions of the scintillations occurring within the unit may be determined by measurements taken at the two ends of each crystal.

2. The scintillation crystal of claim 1 wherein the members are substantially parallel bars having a generally uniform cross-section and spaced from each other.

3. The scintillation crystal of claim 2 wherein the sides of the bars are in contact with one another.

4. The scintillation crystal of claim 2 wherein the cross-sections are uniform and the bars are spaced from each other and have a reflective member between said bars.

* * * * *